(No Model.)
C. A. KÜNZEL.
FISHING DEVICE.
No. 467,120.  Patented Jan. 12, 1892.
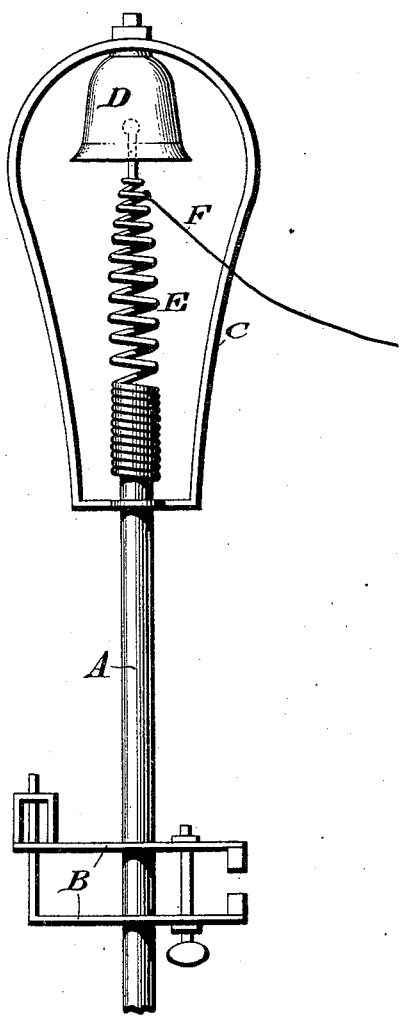
Witnesses
P. F. Nagle
Wm. C. Wiedersheim
Inventor
Charles A. Künzel
By Attorney
Joshua Wiedersheim

UNITED STATES PATENT OFFICE.

CHARLES A. KÜNZEL, OF CAMDEN, NEW JERSEY, ASSIGNOR OF ONE-HALF TO CHARLES F. ELSER, OF PHILADELPHIA, PENNSYLVANIA.

FISHING DEVICE.

SPECIFICATION forming part of Letters Patent No. 467,120, dated January 12, 1892.

Application filed June 8, 1891. Serial No. 395,498. (No model.)

*To all whom it may concern:*

Be it known that I, CHARLES A. KÜNZEL, a citizen of the United States, residing in the city and county of Camden, State of New Jersey, have invented a new and useful Improvement in Fishing Devices, which improvement is fully set forth in the following specification and accompanying drawing.

My invention relates to improvements in fishing devices; and it consists of a spring-arm carrying a hammer of a gong or bell and having the fishing-line secured thereto, substantially as described.

In the drawing, which represents a fishing device embodying my invention, A designates a rod or standard having a clamping attachment B thereon for securing it in place. On the rod A is secured an open frame C, formed of an arched bar or frame, to which is attached a bell D, and on the upper portion of the said rod is secured a coil-spring E, extending beyond the end of the rod and carrying a hammer adapted to strike the said bell D. To the upper end of the coil E is connected the fishing-line F. It will be seen that any movement of the line F due to the nibbling or biting of the bait by a fish will draw the upper end of the coil with the hammer, so as to ring the bell, thus giving an alarm, and owing to the resiliency of the said coil, when the power or force exerted by the fish in biting at the bait on the hook is stopped, the coil-spring will be quickly drawn back with the line F, whereby the hook on the line may forcibly come in contact with the fish, hooking the same. The arched bar forming the frame C prevents the entanglement of the fish-line with the coil-spring arm E during the movements of the fish.

It will be seen that the device is sensitive, as the fish is only required to pull the coil and the small bell-hammer thereon.

Having thus described my invention, what I claim as new, and desire to secure by Letters Patent, is—

1. A rod, a yoke or frame secured to said rod, and a bell mounted on said yoke, in combination with a spring which is attached to said rod and located within the yoke or frame, and a bell-hammer which is carried by said spring, substantially as described.

2. In a fishing device, a rod and a bell rigidly supported thereon, in combination with a bell-hammer and a spring attached to said rod, the said spring carrying said hammer, substantially as described.

CHARLES A. KÜNZEL.

Witnesses:
JOHN A. WIEDERSHEIM,
A. P. JENNINGS.